US006753472B2

(12) United States Patent
Ito

(10) Patent No.: US 6,753,472 B2
(45) Date of Patent: Jun. 22, 2004

(54) JOINING STRUCTURE FOR JUNCTION BOX AND ELECTRICAL COMPONENT CONNECTOR BLOCK

(75) Inventor: Katsuya Ito, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/441,092

(22) Filed: May 20, 2003

(65) Prior Publication Data

US 2003/0226679 A1 Dec. 11, 2003

(30) Foreign Application Priority Data

Jun. 10, 2002 (JP) ........................................ 2002-168891

(51) Int. Cl.$^{7}$ .................................................. H02G 3/08

(52) U.S. Cl. .......................... 174/50; 174/59; 439/76.2; 439/949; 220/4.02

(58) Field of Search ........................ 174/50, 135, 17 R, 174/53, 58, 59, 65 R; 220/3.2, 3.8, 3.3, 4.01, 3.7, 4.02; 439/76.1, 949, 76.2, 574, 701, 516, 923, 515; 200/297; 361/730, 724

(56) References Cited

U.S. PATENT DOCUMENTS

| | | | | | |
|---|---|---|---|---|---|
| 4,580,861 | A | * | 4/1986 | Kaley | 439/717 |
| 4,649,230 | A | * | 3/1987 | Nielsen | 174/50 |
| 5,295,870 | A | * | 3/1994 | Rei et al. | 439/715 |
| 5,507,077 | A | * | 4/1996 | Kotajima | 439/532 |
| 5,702,021 | A | * | 12/1997 | Ito | 220/326 |
| 5,834,692 | A | * | 11/1998 | Lentz | 220/4.02 |
| 5,837,938 | A | * | 11/1998 | Sakamoto | 174/66 |
| 5,839,594 | A | * | 11/1998 | Barbour | 220/3.7 |
| 5,868,583 | A | * | 2/1999 | Naitou et al. | 439/76.2 |
| 5,897,385 | A | * | 4/1999 | Kasai | 439/76.2 |
| 5,915,978 | A | * | 6/1999 | Hayakawa et al. | 439/76.2 |
| 6,022,247 | A | | 2/2000 | Akiyama et al. | |
| 6,196,882 | B1 | | 3/2001 | Sato et al. | |
| 6,413,118 | B2 | * | 7/2002 | Fukatsu | 439/717 |

FOREIGN PATENT DOCUMENTS

| | | | | |
|---|---|---|---|---|
| FR | 2742004 | | 6/1997 | |
| JP | 10108337 | | 4/1998 | |
| JP | 2000-12168 | * | 1/2000 | H01R/13/73 |

OTHER PUBLICATIONS

Saka et al (Electric Connection Box) Jun. 12, 2003. U.S. 2003/0109150.*
English Language Abstract of JP 10–108337.

* cited by examiner

*Primary Examiner*—Dean Reichard
*Assistant Examiner*—Angel R. Estrada
(74) *Attorney, Agent, or Firm*—Greenblum & Bernstein, P.L.C.

(57) ABSTRACT

A connecting structure between an adjacently aligned junction box and electrical component connector block includes a connector block having an insertion bracket around which a channel or groove is formed at an insertion bracket base portion. This channel or groove is configured such that the point of material failure or fracture occurs on the connector block in the event that the connecting structure is subject to a large externally induced load.

11 Claims, 8 Drawing Sheets

JOINING STRUCTURE FOR JUNCTION BOX AND ELECTRICAL COMPONENT CONNECTOR BLOCK

BACKGROUND OF THE INVENTION

1. Field of the Invention

The invention relates to a structure that joins a junction box and an electrical component connector block. The structure is configured so as to prevent material failure of the connecting components on the junction box.

2. Description of the Related Art

Modern automobiles incorporate an increasing number of electrical components, which has resulted in an increase in the size of junction boxes used to connect electrical power and signal circuits, and increasingly complex junction box structures. As a result of this tendency toward larger and more complex junction boxes, and the requirement that junction boxes be capable of flexibly adapting to changes in the layout of circuits connected thereto, connecting structure must be provided to connect relay blocks, fuse blocks, and similar components to the junction box.

FIGS. 8A and 8B illustrate a conventional connecting structure for joining a junction box 1 and a relay block 4. In this structure, relay block 4 is joined to a junction box frame 2 through an insertion portion 5 located on an external sidewall 4*b* of relay block 4, and a receiver bracket 3 located on an external sidewall 2*a* of junction box frame 2. Relay block 4 is attached to junction box frame 2 by aligning insertion portion 5 over receiver bracket 3 and sliding relay block 4 downward. Attachment is complete when insertion portion 5 slides downward to a fully inserted position within receiver bracket 3, such that relay block 4 is aligned adjacent to junction box 1. A relay 4*a* can then be inserted into the upper surface of the attached relay block 4.

With relay block 4 attached to the junction box 1 in an adjacently aligned position, the force required to insert relay 4*a* into the relay block is applied as a leveraged load to receiver bracket 3 and insertion portion 5. As shown in FIG. 8C, external sidewall 2*a* of receiver bracket 3 is prone to material failure when a load greater than that required for insertion of the relay 4*a* is applied to the connecting components. If frame 2 of the junction box 1 is made from a glass impregnated resin, the connecting structure may fail more easily as a result of a load concentrated at a single point. The leverage force becomes more pronounced and the potential for material failure increases when multiple rows of relays 4*a* are installed onto the relay block 4, particularly during insertion of the outer row of relays 4*a*.

Further, the application of an externally induced shock, such as a force resulting from the junction box 1 being dropped, or from other objects striking or applying force to the relay block 4, can induce the material failure of sidewall 2*a* and receiver bracket 3 on junction box frame 2. This type of failure is especially likely if frame 2 is molded from a glass impregnated resin. Moreover, because junction box 1 is a large and complex structure that costs more to produce than an attached electrical component connector block, such as relay block 4, the replacement cost of the junction box is higher than that of the relay block.

SUMMARY OF THE INVENTION

The present invention has been made in view of the above-described problems. Accordingly, it is an object of the present invention to provide a structure for joining an electrical component connector block, such as a relay block, fuse block, or similar component, to a junction box in adjacent alignment, wherein the connecting structure is not prone to material failure, and wherein the more expensive junction box will not incur material failure in the event that excessive force is applied to the connecting structure.

According to one aspect of the present invention, there is provided connecting structure for adjacently joining a junction box and an electrical connector block, the connector block including a component receptacle portion on an upper surface thereof. The connecting structure includes a receiver bracket provided on a sidewall of the junction box, an insertion bracket provided on a sidewall of the connector block, and a groove formed in a base portion of the insertion bracket adjacent to the sidewall of the connector block. The groove forms a weakened portion of the insertion bracket, such that material failure occurs at the weakened portion of the insertion bracket under a condition in which an excessive force is applied to a joined junction box and connector block.

Because the groove on the connector block is the weakest point in the connecting structure and will be the origin of any material failure, only the connecting structure that is part of the connector block will suffer material failure in the event that excessive external force is applied to the connecting structure. This structure can thus prevent material failure of the more expensive junction box case.

According to a further aspect of the present invention, the groove is formed around an entire periphery of the base portion of the insertion bracket. The groove may also have a V-shaped cross section, for the desirable failure localization characteristics thereof.

The connecting structure may further include reinforcement ribs provided on the sidewall of the junction box below the receiver bracket. The provision of such reinforcing ribs increases the strength of the receiver bracket on the junction box against an excessive externally applied load, thus providing further assurance that an excessive load will not result in material failure of the junction box connecting component.

The connector block may be a relay block, and the component receptacle portion of the connector block may be configured to receive at least one relay inserted therein. The connector block may be a fuse block, and the component receptacle portion of the connector block may be configured to receive at least one fuse inserted therein.

According to a further aspect of the present invention, the connecting structure includes a protruding hook portion provided on the connector block. The hook portion is configured to connect to an upper edge of a sidewall of the junction box. The hook portion may be provided on the sidewall of said connector block. The hook portion distributes a force resulting from insertion of a component into the component receptacle portion of the connector block along the upper edge of the junction box sidewall. The groove may also be formed in a base portion of the hook portion adjacent to the sidewall of the connector block.

As this structure provides for a hook part that connects to the junction box case, the load applied by the insertion of components into the component receptacle will not only be distributed through the connecting structure, but also through the sidewall as a result of the hook part joined thereto. A structure is thus formed that is able to adequately resist loads incurred as a result of component insertion even though a groove has been provided around the base part of the insertion bracket at the connector block sidewall.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
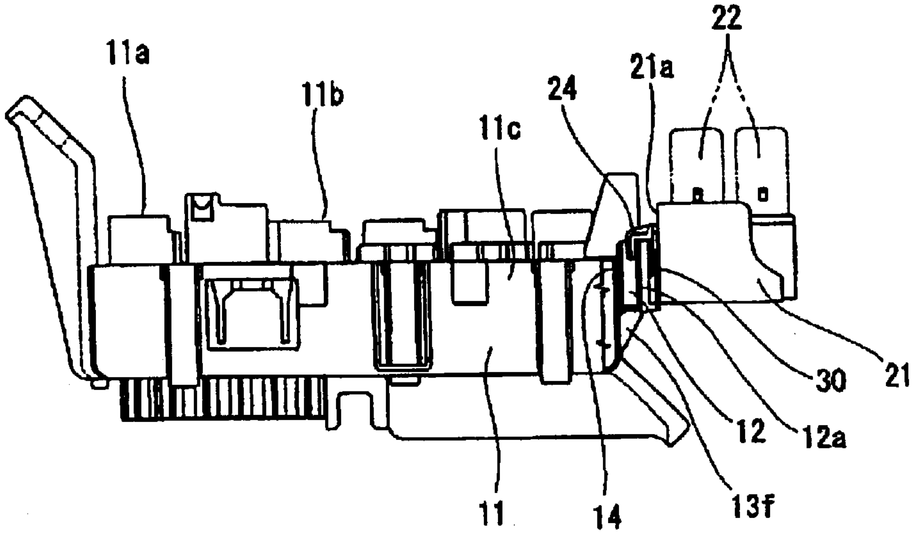
FIG. 1 is a partial cross sectional side view showing joining structure for a junction box and electrical component connector block according to a first embodiment of the invention.

An embodiment of the present invention will be described below with reference to the attached drawings. FIGS. 1 through 7 illustrate a connecting structure between a junction box and a connector block as embodied by the invention. FIG. 1 illustrates the connecting structure between junction box 11, to which an automotive wire harness may be attached, and an electrical component connector block in the form of relay block 21.

The junction box 11 may be formed as a box-type structure made of any suitable material, such as a glass impregnated resin. Junction box 11 includes a connector 11*a* to which a wire harness connector may be attached, a component connector 11*b* to which various electrical components may be installed, and a bus bar (not shown) which is configured to connect circuits within the junction box. A pocket 12 extends outward from a specific location on a perimeter wall 11*c* of junction box 11 and forms a space for the connection of relay block 21. A receiver bracket 13 forms one side of joint portion 30 that fixedly attaches relay block 21 to an external surface of a sidewall 12*a* of pocket 12. Insertion bracket 23 located on the relay block 21 forms the other side of joint portion 30.

Figure 2:
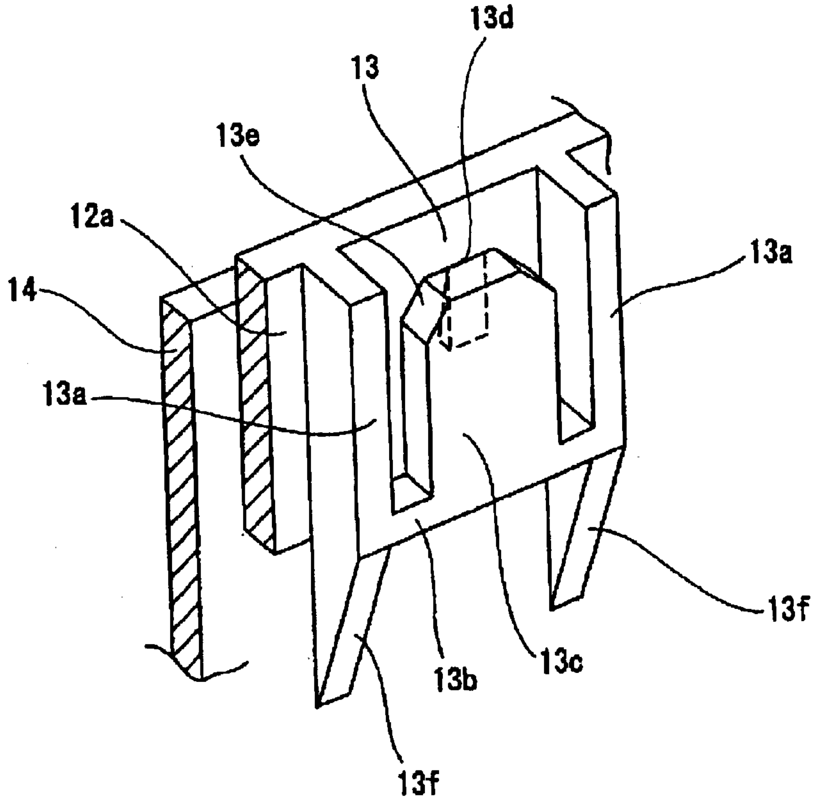
FIG. 2 is an enlarged perspective view of a receiver bracket portion of the junction box of FIG. 1.
Figure 3A:
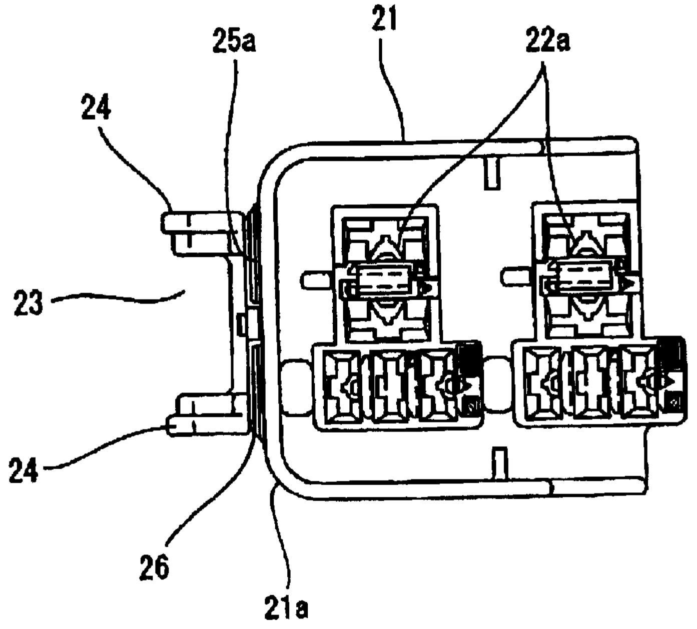
FIG. 3A is a plan view of the relay block of FIG. 1.
Figure 3B:
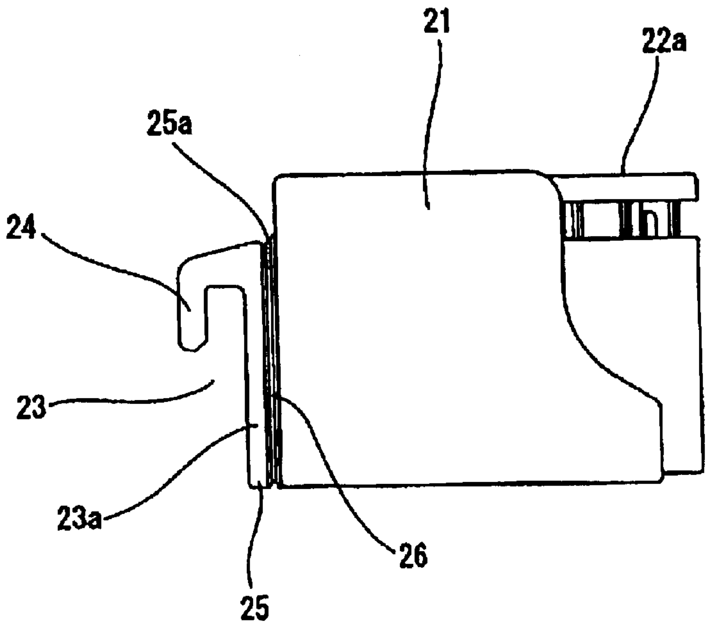
FIG. 3B is a side view of the relay block of FIG. 1.

As shown in FIG. 2, receiver bracket 13 includes a pair of vertically oriented guide ribs 13*a* that extend downward on the external surface of sidewall 12*a*, and are spaced from each other at a distance corresponding to the width of insertion bracket 23. A stop base 13*b* is provided between the lower ends of guide ribs 13*a*. The stop base 13*b* connects guide ribs 13*a* and positions insertion bracket 23 of relay block 21 within receiver bracket 13 by providing a contact surface for the lower end of insertion bracket 23. A flexible tongue 13*c* is provided on a center portion of stop base 13*b*, extending upward between guide ribs 13*a*, and is configured so as to provide spaces between tongue 13*c* and guide ribs 13*a*. The inner surface of a top portion of tongue 13*c* includes a lock latch 13*d* that inclines upward and inward to the top edge of tongue 13*c*. Chamfered surfaces 13*e* are formed on the upper corners of tongue 13*c* for aiding the insertion of insertion bracket 23. Reinforcing ribs 13*f* extend downward from the lower portion of stop base 13*b* between receiver bracket 13 and perimeter wall 11*c* for further supporting stop base 13*b*. Moreover, pocket 12 of junction box 11 includes an internal sidewall 14, which is internal to, spaced from and parallel with sidewall 12*a*, with the top of internal sidewall 14 being located below the top of sidewall 12*a*.

As shown in FIGS. 3A through 4B, relay block 21 may be formed as a box-like structure made of any suitable material, such as a synthetic resin. In this embodiment, the upper portion of relay block 21 is provided with two adjacently aligned relay receptacles 22*a* into which relays 22 may be inserted. Insertion bracket 23 is provided on an external surface of a sidewall 21*a* of relay block 21 as a structure for attachment to receiver bracket 13 on junction box 11.

Figure 4A:
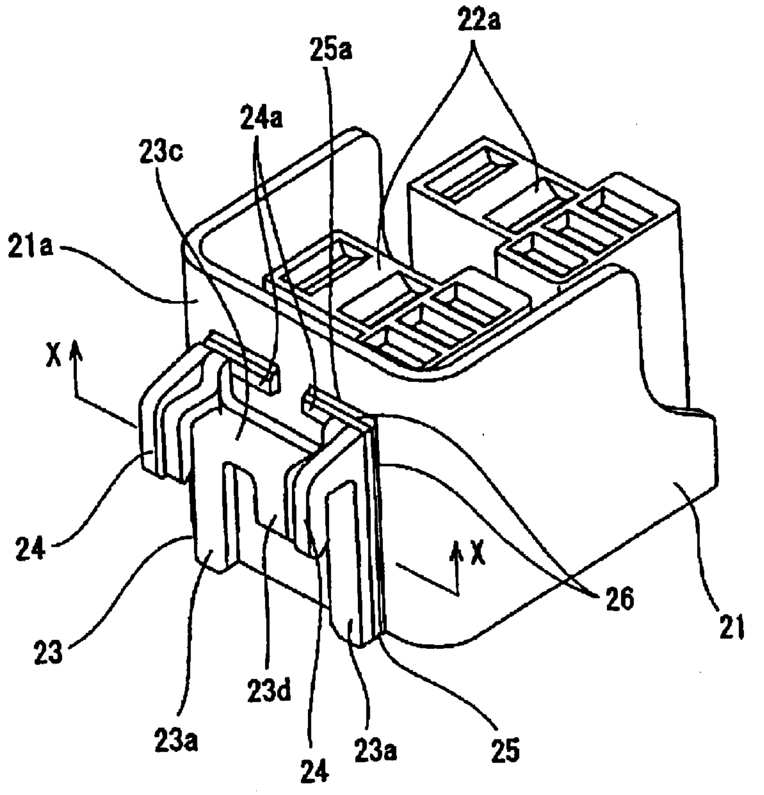
FIG. 4A is a perspective view of the relay block of FIG. 1.
Figure 4B:
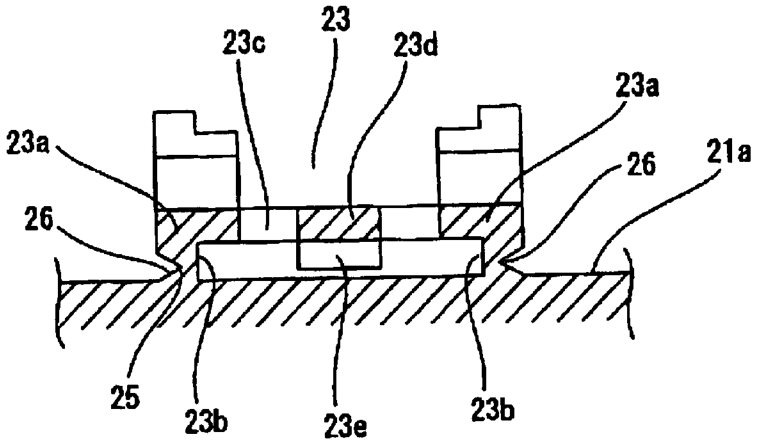
FIG. 4B is a cross sectional view taken along line X—X of FIG. 4A.

As shown in FIG. 4A, insertion bracket 23 includes two protruding guide rails 23*a* that are configured to slide into the space between guide ribs 13*a*. As shown in FIG. 4B, a guide channel 23*b* is formed between the opposed inner surfaces of guide rails 23*a* to provide space for the entry of tongue 13*c* between guide rails 23*a*. Moreover, a flange 23*c* having the same width as guide channel 23*b* is provided between the upper ends guide rails 23*a*. A flexible finger 23*d* extends downward from a central portion of flange 23*c*. A lock tab 23*e*, is formed as a protruding portion extending from the inner surface of finger 23*d* for engaging and connecting to lock latch 13*d* of junction box 11. Lock tab 23*e* is positioned so as to lock against lock latch 13*d* when insertion bracket 23 of relay block 21 is inserted into receiver bracket 13 of junction box 11 to a point at which the lower end of guide rails 23*a* contacts with stop base 13*b*.

A pair of inverted L-shaped hook portions 24 are provided at the upper portion of guide rails 23*a* of relay block 21, and extend outwardly from sidewall 21*a* such that their top portions are configured to hook over and connect with the upper edge of sidewall 12*a* of junction box 11. The hook portions 24 are preferably formed unitarily and in one piece with the relay block 21. Hooks portions 24 connect to the top edge of sidewall 12*a* when insertion bracket 23 enters receiver bracket 13, and are configured to straddle portions of sidewall 12*a* between guide rails 23*a*.

A channel or groove 26, which may be of any suitable shape, such as having a V-shaped cross section, extends completely around a base portion 25 of insertion bracket 23 at the location where insertion bracket 23 meets the external surface of sidewall 21*a*. As shown in FIG. 4A, channel or groove 26 extends from the base of hook portions 24 along reinforcement flanges 24*a* that extend oppositely inward from hook portions 24. When external pressure is applied to joint portion 30 after junction box II and connector block 21 have been mutually connected, channel 26, which may be formed unitarily and in one piece with connector block 21, is configured to act as the origin point of any breakage or material failure. In this manner, the channel or groove 26 allows for any material failure to occur within the connector block 21. The depth of channel 26 is configured so that any material failure or breakage will occur within insertion bracket 23 rather than in junction box 11. As shown in FIG. 4B, the inner angle of channel 26 may be approximately 90 degrees.

It is preferable that channel or groove 26 is configured to be deeper at an upper region 25*a* located at the upper side of base portion 25 opposite to component receptacle 22*a*. In this manner, when an excessive load is applied to insertion bracket 23, upper region 25*a* can become the initial origin point of material failure or fracture of insertion bracket 23. Accordingly, channel or groove 26 functions as a fracture initiation portion or weakened portion of the insertion bracket 23 and connector block 21.

Figure 5A:
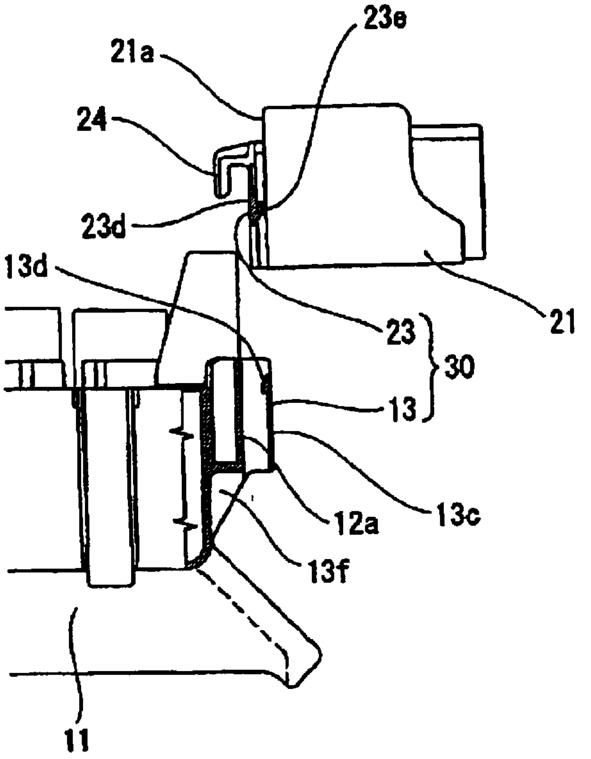
FIGS. 5A and 5B are enlarged partial cross sectional side views illustrating the process through which the relay block is attached to the junction box of FIG. 1.
Figure 5B:
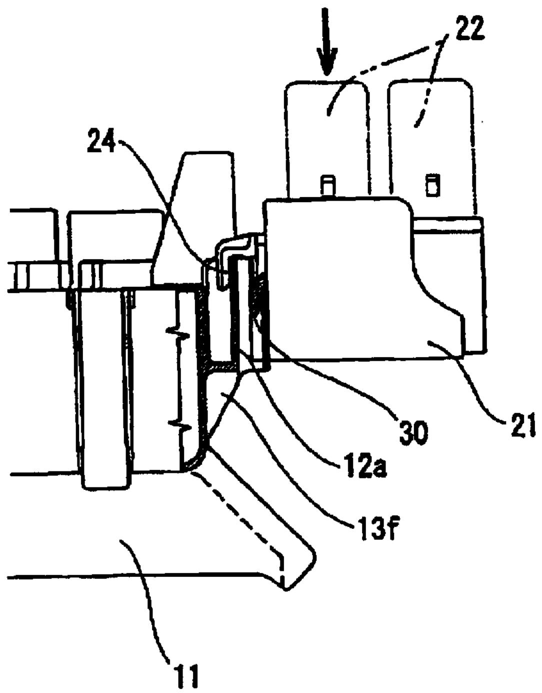
Figure 6:
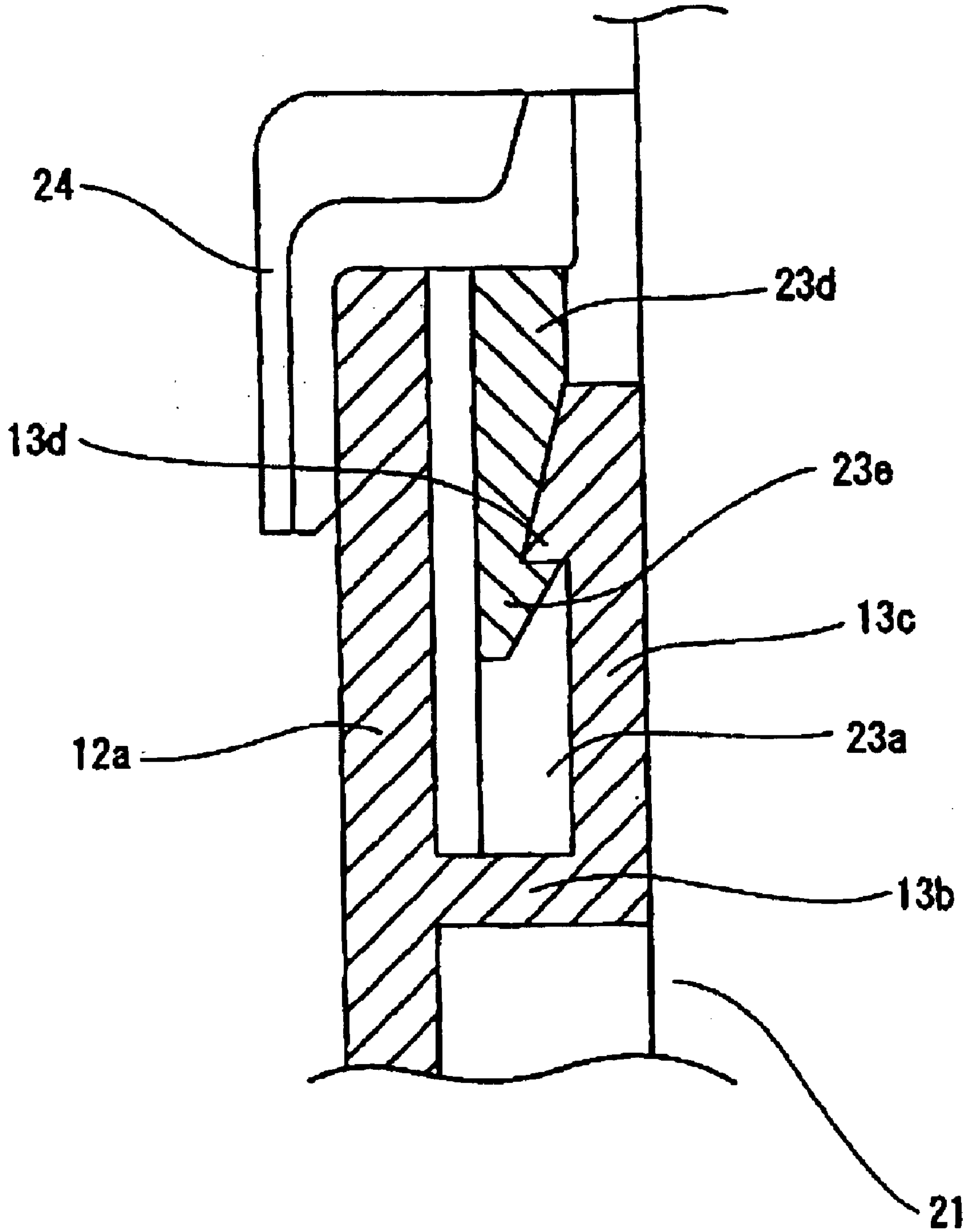
FIG. 6 is an enlarged cross sectional view of the connecting structure between the junction box and relay block of FIG. 1.

The following will describe the operation through which the respective connecting structures of the first embodiment are joined. As shown in FIG. 5A, in order to connect relay block 21 to junction box 11, relay block 21 is first positioned such that insertion bracket 23 is located above and aligned with receiver bracket 13. The relay block 21 is moved downward to insert the external lateral faces of guide rails 23*a* of insertion bracket 23 into the internal space between guide ribs 13*a* of receiver bracket 13. Tongue 13*c* slides into guide channel 23*b* and finger 23*d* slides into the space between tongue 13*c* and sidewall 12*a*. At the same time, hook portions 24 pass over and connect to the upper edge of sidewall 12*a* of junction box 11. Moving relay block 21 still further downward causes lock latch 13*d* on tongue 13*c* to press against lock tab 23*e* on finger 23*d*. The flexibility of the tongue 13*c* and finger 23*d* permits their mutual displacement allowing lock tab 23*e* to ride over and lock against lock latch 13*d* as illustrated in FIGS. 5B and 6. In this condition, the lower edges of guide rails 23*a* contact with stop base 13*b* while hook portions 24 connect to the upper edge of sidewall 12*a*, thus joining relay block 21 to junction box 11 in an adjacently aligned position.

With relay block 21 installed onto junction box 11, a relay 22 may be pushed into a relay receptacle 22*a* from above. The insertion load applied to relay block 21 during the insertion of relay 22 would normally be leveraged in a concentrated manner against tongue 13*c* and finger 23*d*. However, the structure of the first embodiment prevents damage to the receiver bracket 13 and insertion bracket 23 by distributing the relay insertion load through the joint connection formed by hook portions 24 straddling sidewall 12*a*.

If an unexpected external force, such as that resulting from the junction box being dropped, is applied to receiver bracket 13 and insertion bracket 23 (which together form joint portion 30 between junction box 11 and relay block 21), channel or groove 26, which is formed around base portion 25 of insertion bracket 23 of relay block 21, acts as the origin point of material failure within insertion bracket 23. As a result of this structure, the aforesaid material failure is incurred only by relay block 21 and not by the more expensive junction box 11, even though the overall connecting structure between junction box 11 and relay block 21 has been subject to material failure.

While the embodiments have described the electrical component connector block as a relay block 21, the invention also includes joint structure for connecting a fuse block, a combined fuse and relay block, or similar components, to a junction box 11. Also, while the embodiments have described relay block 21 as containing two rows of receptacles 22*a*, relay block 21 may contain any number of receptacles. Further, as the leveraging load increases in proportion to the number of receptacles contained in the relay block, the connecting structure should be strengthened accordingly. In this regard, additional hook portions may be provided. Moreover, while the channel or groove 26 has been described as being V-shaped in cross section, channel 26 may also be U-shaped or rectangular in cross section.

Figure 7:
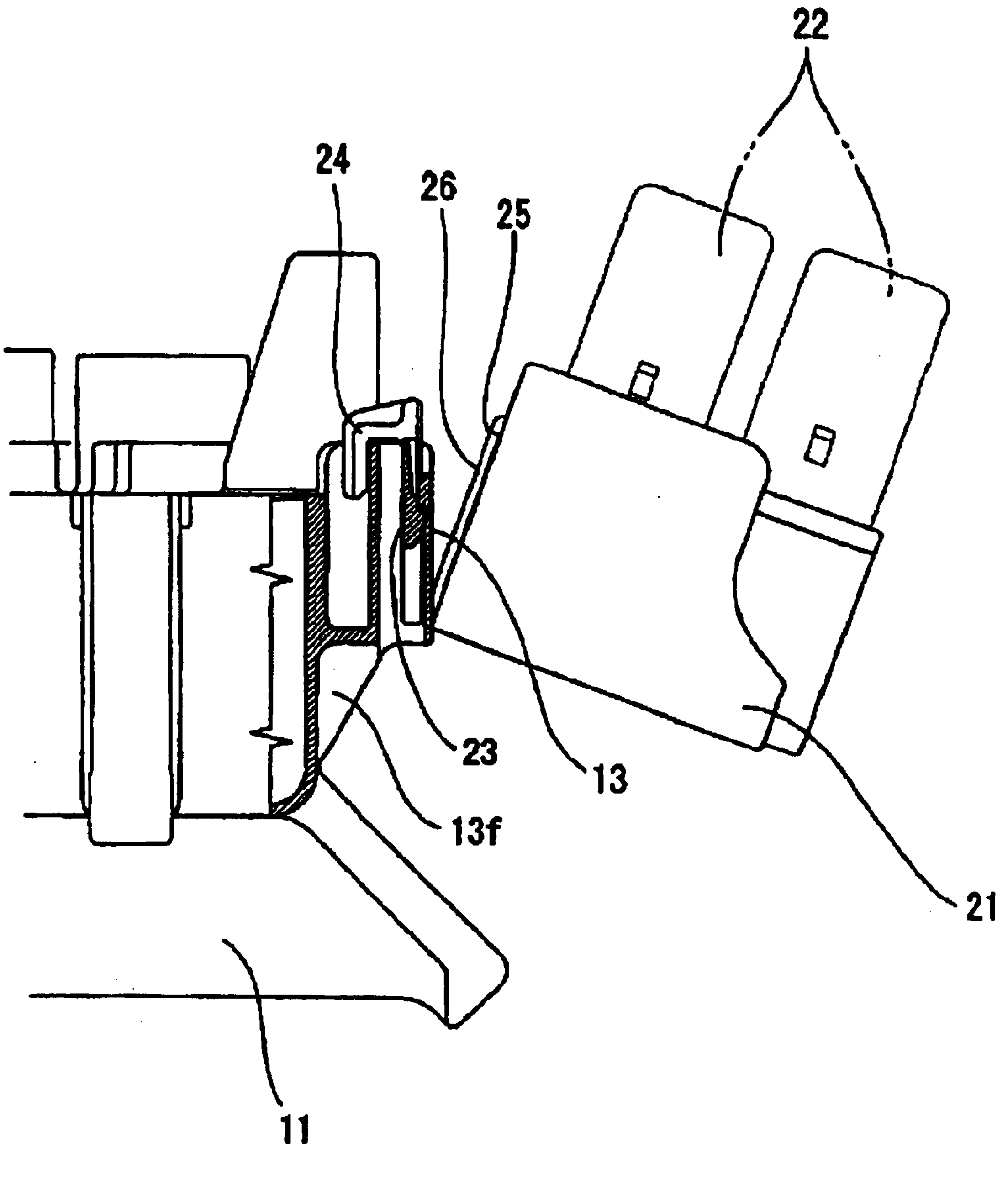
FIG. 7 is an enlarged partial cross sectional side view illustrating material failure damage occurring in the relay block of FIG. 1.
Figure 8A:
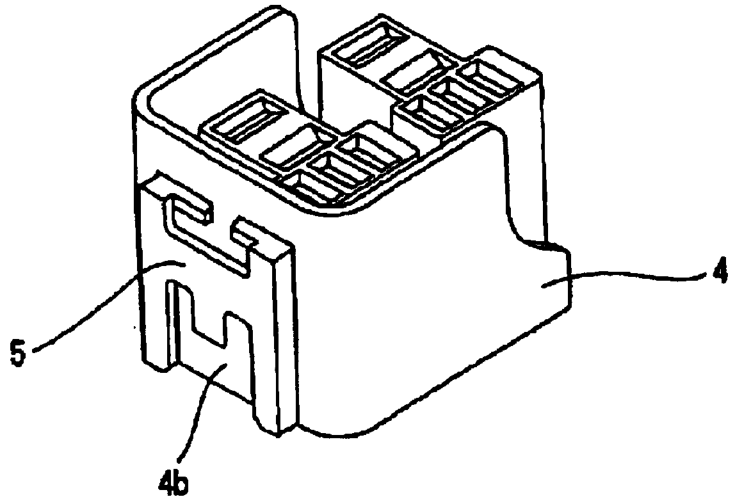
FIG. 8A PRIOR ART
FIG. 8A is a perspective view.
Figure 8B:
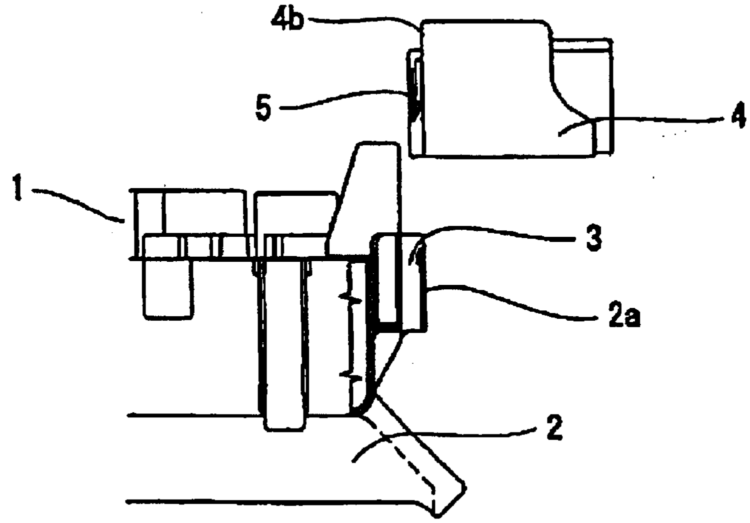
FIG. 8B PRIOR ART
FIGS. 8B and 8C are partial cross sectional side views, showing a conventional connecting structure for joining a junction box and a relay block.
Figure 8C:
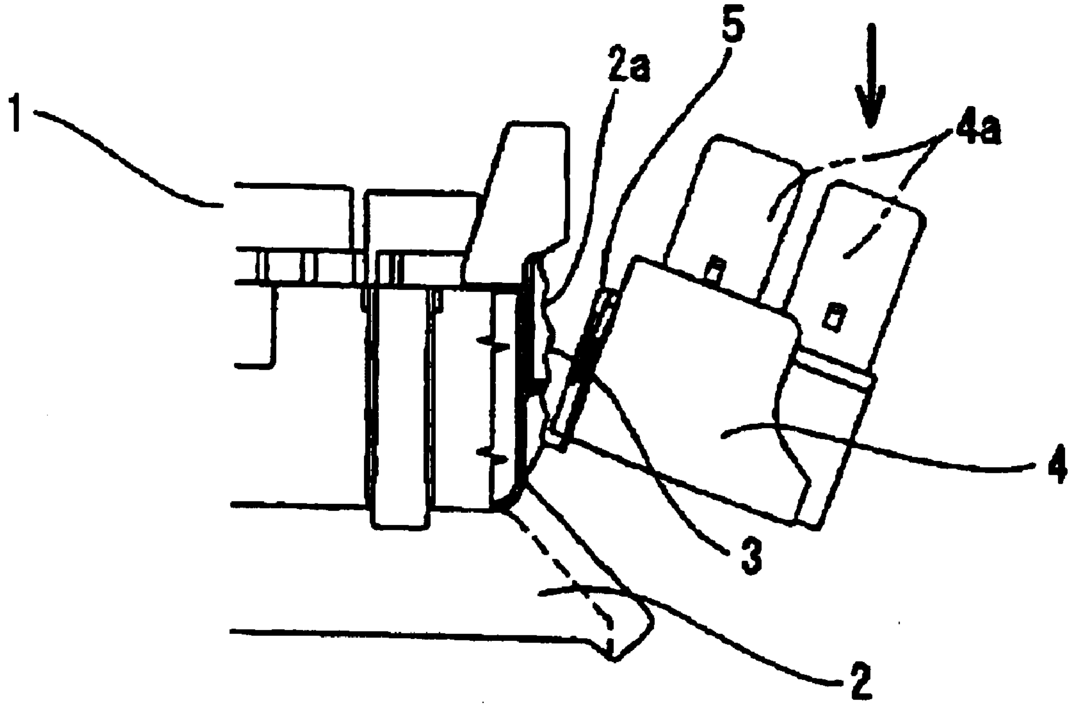
FIG. 8C PRIOR ART

If the structure connecting the junction box and connector block is subject to an excessively large externally induced load to the extent that there is material failure or fracturing of the connecting structure, such material failure or fracturing occurs at the channel or groove formed on the connector block, as shown in FIG. 7. As a result, material failure of the more costly junction box is prevented, and damage to the connecting structure is kept to a minimum.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Patent Application No. 2002-168891 filed on Jun. 10, 2002, which is herein expressly incorporated by reference in its entirety.

What is claimed:

1. A connecting structure for adjacently joining a junction box and an electrical connector block, said connector block including a component receptacle portion on an upper surface thereof, said connecting structure comprising:

a receiver bracket provided on a sidewall of said junction box;

an insertion bracket provided on a sidewall of said connector block; and a groove formed in a base portion of said insertion bracket adjacent to the sidewall of said connector block, said groove forming a weakened portion of said insertion bracket;

wherein material failure occurs at the weakened portion of said insertion bracket under a condition in which an excessive force is applied to a joined junction box and connector block.

2. The connecting structure according to claim 1, wherein said groove is formed around an entire periphery of the base portion of said insertion bracket.

3. The connecting structure according to claim 1, further comprising:

reinforcement ribs provided on the sidewall of said junction box below said receiver bracket.

4. The connecting structure according to claim 2, further comprising:

reinforcement ribs provided on the sidewall of said junction box below said receiver bracket.

5. The connecting structure according to claim 1, wherein said groove has a V-shaped cross section.

6. The connecting structure according to claim 1, wherein said connector block comprises a relay block, and the component receptacle portion of said connector block is configured to receive at least one relay inserted therein.

7. The connecting structure according to claim 1, wherein said connector block comprises a fuse block, and the component receptacle portion of said connector block is configured to receive at least one fuse inserted therein.

8. The connecting structure according to claim 1, further comprising:

a protruding hook portion provided on said connector block, said hook portion being configured to connect to an upper edge of a sidewall of said junction box.

9. The connecting structure according to claim 8, wherein said hook portion is provided on the sidewall of said connector block.

10. The connecting structure according to claim 8, wherein said hook portion distributes a force resulting from insertion of a component into the component receptacle portion of said connector block along the upper edge of said junction box sidewall.

11. The connecting structure according to claim 8, wherein said groove is also formed in a base portion of said hook portion adjacent to the sidewall of said connector block.

* * * * *